No. 629,776. Patented Aug. 1, 1899.
G. W. CRAWFORD.
COFFEE OR TEA POT.
(Application filed Apr. 27, 1899.)

(No Model.)

WITNESSES
Louis D. Heinrichs
Chas. S. Hoyer

INVENTOR
George W. Crawford
By Victor J. Evans
Attorney

THE NORRIS PETERS CO., PHOTO-LITHO., WASHINGTON, D. C.

UNITED STATES PATENT OFFICE.

GEORGE W. CRAWFORD, OF LARNED, KANSAS.

COFFEE OR TEA POT.

SPECIFICATION forming part of Letters Patent No. 629,776, dated August 1, 1899.

Application filed April 27, 1899. Serial No. 714,744. (No model.)

*To all whom it may concern:*

Be it known that I, GEORGE W. CRAWFORD, a citizen of the United States, residing at Larned, in the county of Pawnee and State of Kansas, have invented certain new and useful Improvements in Coffee or Tea Pots; and I do hereby declare the following to be a full, clear, and exact description of the invention, such as will enable others skilled in the art to which it appertains to make and use the same.

This invention relates to coffee or tea pots; and the purpose of the same is to provide means for confining the ground coffee or tea, irrespective of the degree of fineness, within a receptacle in such manner as to cause a thorough percolation therethrough of hot water which is poured thereon in the operation of making the coffee or tea, to confine the steam completely within the attachment and thereby preserve the aroma within the distilled coffee or tea and make the latter more palatable, to prevent the coffee-grounds or tea-leaves or particles from passing downward into the distilled coffee or tea within the body of the pot, and to make the parts separable, so that they may be easily cleaned, or other like devices substituted therefor when desired or necessary.

The invention essentially comprises a lid or cover for the pot having a comparatively narrow depending inverted conical receptacle connected with the apex of a receiver and at the point of connection supplied with a foraminate separable cover or screen, the base of the receiver also having removably applied thereto a partial bottom cover adapted to receive a strainer of suitable nature.

The invention further consists of the details of construction and arrangement of the several parts, which will be hereinafter more fully described and claimed.

Figure 1:
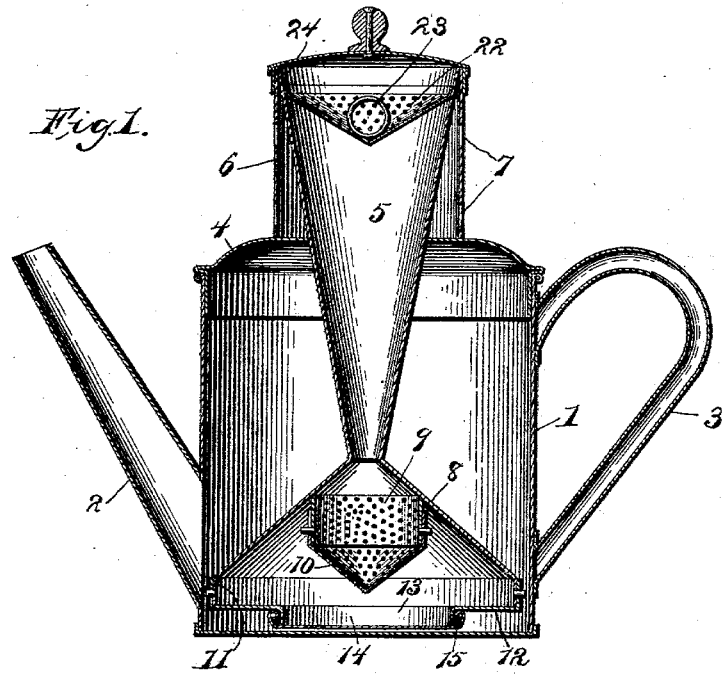
Figure 2:
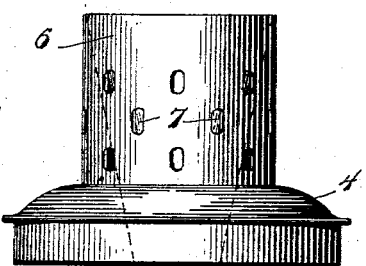
Figure 3:
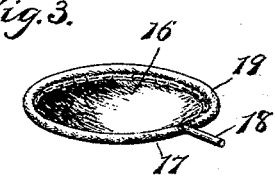
Figure 4:
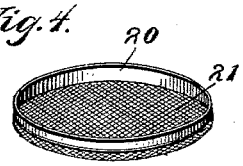

In the accompanying drawings, Figure 1 is a transverse vertical section of a coffee or tea pot embodying the invention and showing the improved attachment in section therein. Fig. 2 is a detail elevation of the improved attachment disconnected and broken away to illustrate the internal construction in part. Fig. 3 is a detail perspective view of a fabric strainer adapted to be removably attached to the lower portion or partial bottom cover of the condenser. Fig. 4 is a detail perspective view of another form of said strainer.

Like characters of reference are utilized to indicate corresponding parts in the several views.

Referring to the drawings, the numeral 1 designates a coffee or tea pot of any suitable material and having a pouring-spout 2 at one side and a handle 3 at the opposite side. The usual lid or cover 4 is employed to close the top of the body 1 and in the present instance has an opening cut through the center thereof, in which is mounted an inverted conical receptacle 5 of comparatively narrow extent at its greatest diameter and projects above and below the said lid or cover. Surrounding that part of the receptacle 5 which stands above the lid or cover 4 is a condensing-cylinder 6, which is secured permanently in position both to the receptacle and lid or cover and has apertures 7 therein at regular intervals, which permit a circulation of air between the inner part of the same and the receptacle for lowering the temperature, so that the hand of the operator may be applied with convenience and avoid burning and also to set up a condensation. The lower reduced end of the receptacle 5 is secured to the apex of a conical receiver 8, and within the upper part of the latter, over the opening of said receptacle, is a foraminate guard 9, to which an apertured cap 10 is removably applied by bayonet-joints. The base of the receiver 8 has a depending peripheral flange 11, and thereto is removably connected a partial bottom cover 12 by means of bayonet-joints and having a central opening 13, walled by a rim 14, formed with a lower beaded or rolled edge 15.

When the coffee or tea that is placed in the receptacle 5 is of a very fine nature, the strainer 16 (illustrated by Fig. 3) is mounted over the beaded rim just referred to, and comprises a spring-wire frame 17, having an outwardly-projecting operating-finger 18, and thereto is secured a covering 19 of suitable textile fabric. When the coffee or tea is of a coarser nature, the strainer shown by Fig. 4 is utilized and comprises a surrounding band 20, with a reticulated cover 21.

In applying the strainer 16 the spring-wire frame 17 is sprung over the rim 14 and is held in place by the beaded or rolled edge 15. In applying the strainer shown by Fig. 4 the band 20 is slipped up over the rim 14, and one device may be substituted for the other, as occasion may require.

In the upper part of the receptacle 5 an inverted conical strainer or shield 22 is removably mounted and has a finger ring or loop 23 in the center thereof for operating purposes, and the top of the cylinder 6, as well as the upper end of the said receptacle 5, is closed by a supplemental removable cover 24.

In making coffee in the improved device the coffee is first ground fine and the supplemental lid 24 is removed from the condenser-cylinder, and the receptacle 5 is cleared by withdrawing the shield or strainer 22, and said ground coffee then placed within the receptacle. The shield or strainer 22 is next placed over the coffee in the receptacle and boiling water is poured in at the top and the supplemental cover again applied to the top of the condenser-cylinder. The boiling water percolates through the ground coffee, and by the use of said conical receptacle the extracting of the coffee essence is more effectual in view of the lower contraction of said receptacle, and by such construction a thorough saturation is set up. During this operation the steam that would naturally arise from the boiling water is prevented from escaping externally, and the upper portion of the receptacle 5 being kept cool by means of the apertured condensing-cylinder 6 a condensation of the said steam takes place and water of condensation, together with the constituents of coffee that may be carried thereby, is caused to fall back and pass through the ground coffee in said receptacle. By this means the aroma of the coffee is preserved and will materially add to the flavor and produce a more palatable distillation. The water that passes through the coffee runs down into the receiver 8 and directly deposits in the guard 9, through which a portion of it passes, and also through the apertured cap 10, and from thence strikes the bottom cover 12 and passes out through either one of the strainers shown by Figs. 3 and 4 and into the body 1 of the pot.

It will be observed that the coffee after leaving the receptacle 5 is prevented from being injured by steaming when it enters the receiver 8, as the latter is virtually closed, and the distillation will have become so fully fixed as to resist any change from heat while it remains in the body 1 of the pot.

In making tea the same operation is pursued and result acquired, and through the medium of the guard 9 and cap 10 coffee-grounds or tea-leaves or particles cannot pass downward into the receiver, and even though small particles might ooze through the apertures in the pot the strainer on the bottom 12 will prevent their passage outwardly into the body of the pot.

When it is desired to dispense the distilled coffee or tea, the attachment will not interfere with the flow through the pouring-spout 2, and successive quantities of boiling water can be poured in upon one charge of coffee or tea and economically produce quantities of either beverage. In various brands of coffee or tea the best results are attained by different degrees of fineness, and the improved attachment accommodates such variation and also a utilization of either a fine or a coarse condition of tea or coffee, as required for other purposes and to suit different tastes.

In separating the parts for cleansing purposes the usual cap or cover 3 is disconnected, the supplemental cap or cover 24 detached, the guard 22 removed, the cap 10 disconnected from the rim 9, and the bottom 12 and either strainer carried thereby also separated. The several separated parts can then be thoroughly washed and purified, and the opening from the receptacle 5 into the receiver 8 is continuous, and water and cleansing devices can be passed therethrough with facility.

In some instances the guard 22 may be extended lower down and used also as a strainer to receive finely-ground coffee or pulverized tea.

In various applications changes in the proportions, dimensions, and minor details of construction will be required and can be made without departing from the nature or spirit of the invention or sacrificing any of the advantages thereof.

Having thus described my invention, what I claim as new, and desire to secure by Letters Patent, is—

1. In a device of the character described, the combination with the pot-body of an inverted conical receptacle supported therein; a condenser surrounding the upper portion of said receptacle; a receiver connected to the lower end of the receptacle, and having a foraminate band and an apertured cap; a cover for the condenser and conical receptacle, and strainers for the receptacle and receiver.

2. In a device of the character set forth, the combination with a pot-body, of an inverted conical receptacle removably mounted therein and having a cover detachably applied to the upper portion thereof, a strainer in the upper part of said receptacle, a receiver connected with the lower portion of the receptacle and having a foraminate band and apertured cap adjacent the point of connection of the two parts, and a partial bottom-closure for the said receiver, having a strainer removably applied thereto.

3. In a device of the character set forth, the combination with a pot-body, of an inverted conical receptacle removably supported therein and having a condenser surrounding the upper portion thereof, a lid or cover removably applied to the upper end of the said condenser and to close over the similar end of the receptacle, a shield or strainer removably mounted in the upper part of the receptacle, a receiver connected to the lower reduced portion of the receptacle and having a foraminate guard supplied with a removable apertured cap adjacent the point of connection of the said devices, a bottom-closure for the receiver having a central opening with a rim, and a strainer removably attached to the said rim.

In testimony whereof I affix my signature in presence of two witnesses.

GEORGE W. CRAWFORD.

Witnesses:
J. F. UPSON,
WM. B. SMITH.